United States Patent
Gomadam et al.

(10) Patent No.: US 9,048,917 B1
(45) Date of Patent: Jun. 2, 2015

(54) METHOD AND APPARATUS FOR ESTIMATING NOISE COVARIANCE IN A WIRELESS NETWORK

(71) Applicant: Marvell International Ltd., Hamilton (BM)

(72) Inventors: Krishna Srikanth Gomadam, San Jose, CA (US); Yakun Sun, Sunnyvale, CA (US); Raphael Cendrillon, Palo Alto, CA (US); Christian R. Berger, San Jose, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 136 days.

(21) Appl. No.: 13/959,498

(22) Filed: Aug. 5, 2013

Related U.S. Application Data

(60) Provisional application No. 61/683,439, filed on Aug. 15, 2012.

(51) Int. Cl.
| | |
|---|---|
| *H04B 1/10* | (2006.01) |
| *H04L 25/02* | (2006.01) |
| *H04L 5/00* | (2006.01) |
| *H04L 25/03* | (2006.01) |
| *H04L 1/02* | (2006.01) |
| *H04L 1/06* | (2006.01) |
| *H04B 7/02* | (2006.01) |
| *H04B 7/04* | (2006.01) |
| *H04W 52/24* | (2009.01) |

(52) U.S. Cl.
CPC .............. *H04B 1/10* (2013.01); *H04L 25/0206* (2013.01); *H04L 25/021* (2013.01); *H04L 5/0023* (2013.01); *H04L 25/0204* (2013.01); *H04L 25/03292* (2013.01); *H04L 25/03993* (2013.01); *H04L 25/0242* (2013.01); *H04L 25/0248* (2013.01); *H04L 25/0328* (2013.01); *H04L 25/024* (2013.01); *H04L 1/02* (2013.01); *H04L 1/0631* (2013.01); *H04B 7/024* (2013.01); *H04B 7/04* (2013.01); *H04W 52/24* (2013.01)

(58) Field of Classification Search
CPC .............. H04L 25/0204; H04L 5/0023; H04L 25/0206; H04L 25/021; H04L 25/03993; H04L 25/0242; H04L 25/0248; H04L 25/0328; H04L 25/03299; H04L 25/03292; H04L 25/024; H04L 1/02; H04L 1/0631; H04B 7/04

See application file for complete search history.

(56) References Cited

U.S. PATENT DOCUMENTS

| | | | |
|---|---|---|---|
| 8,380,154 B2 | 2/2013 | Lindqvist et al. | |
| 8,457,254 B2 | 6/2013 | Khayrallah | |
| 2010/0087151 A1* | 4/2010 | Auer | 455/67.11 |
| 2011/0150154 A1* | 6/2011 | Chen | 375/350 |

OTHER PUBLICATIONS

Gomadam et al., "Modulation and Detection for Simple Receivers in Rapidly Time Varying Channels", IEEE Transactions on Communications, 2007, 10 pages.

* cited by examiner

*Primary Examiner* — Rahel Guarino

(57) ABSTRACT

The present disclosure includes systems and techniques relating to processing received spatially diverse transmissions. In some implementations, an apparatus includes: circuitry configured to receive signals from separate communication inputs; circuitry configured to filter the signals to reduce noise, interference, or both; circuitry configured to estimate covariance of the separate communication inputs, including estimating a correlation between the separate communication inputs; and circuitry configured to apply the covariance estimation to the filtering circuitry to effect noise whitening and to force an underestimation of the correlation between the separate communication inputs as applied.

19 Claims, 7 Drawing Sheets

410

$$u = f(SINR)$$

420

$$u = \begin{cases} u_1 & \text{if } \left|\hat{K}_{12}\right|^2 \leq T_1 \ \hat{K}_{11}\hat{K}_{22} \\ u_2 & \text{if } T_1 \ \hat{K}_{11}\hat{K}_{22} < \left|\hat{K}_{12}\right|^2 \leq T_2 \ \hat{K}_{11}\hat{K}_{22} \\ \vdots \\ u_i & \text{if } T_{i-1} \ \hat{K}_{11}\hat{K}_{22} < \left|\hat{K}_{12}\right|^2 \leq T_i \ \hat{K}_{11}\hat{K}_{22} \\ \vdots \\ u_K & \text{otherwise} \end{cases}$$

$$0 \leq T_1 < T_2 < T_i < T_{K-1} \leq 1$$

430

$u$ = constant for all covariance ensembles

$$u = \begin{cases} 0 & \text{if } |\hat{K}_{12}|^2 \leq T\, \hat{K}_{11}\hat{K}_{22} \\ 1 & \text{otherwise} \end{cases} \quad 0 \leq T \leq 1$$

520

$$u = \begin{cases} 0 & \text{if } \max(\hat{K}_{11}, \hat{K}_{22}) \leq T \\ 1 & \text{otherwise} \end{cases}$$

530

$$u = \begin{cases} 0 & \text{if } \det(\hat{\mathbf{K}}) \geq T\, \hat{K}_{11}\hat{K}_{22} \\ 1 & \text{otherwise} \end{cases}$$

$$u = \begin{cases} 0 & if \ \sum_n \left|\hat{K}_{12}(n)\right|^2 \leq T \sum_n \hat{K}_{11}(n)\hat{K}_{22}(n) \quad 0 \leq T \leq 1 \\ 1 & otherwise \end{cases}$$

620

$$u = \begin{cases} 0 & if \ \frac{1}{N}\sum_{n=1}^{N}\frac{\left|\hat{K}_{12}(n)\right|^2}{\hat{K}_{11}(n)\hat{K}_{22}(n)} \leq T \quad 0 \leq T \leq 1 \\ 1 & otherwise \end{cases}$$

$$u = \begin{cases} u_1 & if \ \sum \left|\hat{K}_{12}(n)\right|^2 \leq T_1 \sum \hat{K}_{11}(n)\hat{K}_{22}(n) \\ u_2 & if \ T_1 \sum \hat{K}_{11}(n)\hat{K}_{22}(n) < \sum \left|\hat{K}_{12}(n)\right|^2 \leq T_2 \sum \hat{K}_{11}(n)\hat{K}_{22}(n) \\ u_i & if \ T_{i-1} \sum \hat{K}_{11}(n)\hat{K}_{22}(n) < \sum \left|\hat{K}_{12}(n)\right|^2 \leq T_i \sum \hat{K}_{11}(n)\hat{K}_{22}(n) \\ \vdots \\ u_K & otherwise \end{cases}$$

Fig. 6

METHOD AND APPARATUS FOR ESTIMATING NOISE COVARIANCE IN A WIRELESS NETWORK

CROSS REFERENCE TO RELATED APPLICATIONS

This application claims the benefit of the priority of U.S. Provisional Application Ser. No. 61/683,439, filed Aug. 15, 2012 and entitled "Robust Noise Covariance Estimation Techniques", which is hereby incorporated by reference in its entirety.

BACKGROUND

The present disclosure describes systems and techniques relating to receiving and processing spatially diverse transmissions.

Mobile phones, smart phones, laptops, base stations and other systems and wireless communication devices can wirelessly transmit and receive data in a wireless network. When operating in an infrastructure mode, a wireless communication device called an access point (AP) provides connectivity with a network such as the Internet to other wireless communication devices, e.g., client stations or access terminals (AT). Wireless communication systems can use one or more wireless communication technologies such as orthogonal frequency division multiplexing (OFDM). In an OFDM based wireless communication system, a data stream is split into multiple data substreams. Such data substreams are sent over different OFDM subcarriers, which can be referred to as tones or frequency tones.

Some wireless communication systems use a single-in-single-out (SISO) communication approach, where each wireless communication device uses a single antenna. Other wireless communication systems use a multiple-in-multiple-out (MIMO) communication approach, where a wireless communication device uses multiple transmit antennas and multiple receive antennas. Moreover, some wireless networks, such as those based on the Institute of Electrical and Electronics Engineers (IEEE) 802.11n wireless communications standard, can use OFDM and MIMO.

SUMMARY

The present disclosure includes systems and techniques relating to processing received spatially diverse transmissions. According to an aspect of the described systems and techniques, an apparatus includes: circuitry configured to receive signals from separate communication inputs; circuitry configured to filter the signals to reduce noise, interference, or both; circuitry configured to estimate covariance of the separate communication inputs, including estimating a correlation between the separate communication inputs; and circuitry configured to apply the covariance estimation to the filtering circuitry to effect noise whitening and to force an underestimation of the correlation between the separate communication inputs as applied.

The circuitry configured to force the underestimation can include circuitry configured to set the underestimation in accordance with a decreasing function of SINR (Signal to Interference plus Noise Ratio), SNR (Signal to Noise Ratio), (2) SIR (Signal to Interference Ratio), or a combination of these. The circuitry configured to force the underestimation can include circuitry configured to turn off the noise whitening when one or more of SNR, SIR, or SINR exceeds a threshold. The threshold can be a fixed threshold or an adaptive threshold.

The circuitry configured to force the underestimation can include circuitry configured to set a piecewise correlation dependent underestimation. The circuitry configured to force the underestimation can include circuitry configured to turn off the noise whitening when correlation falls below a threshold. The circuitry configured to force the underestimation can include circuitry configured to set an underestimation coefficient to a constant greater than zero and less than one. The circuitry configured to force the underestimation can include circuitry configured to set an underestimation coefficient to zero when a determinant (det) of a spatial correlation matrix passes a threshold.

The separate communication inputs can include antennas in a multiple-in-multiple-out communications system, the apparatus can include more than two antennas, and the apparatus can include a baseband processor including the circuitries. In addition, the circuitry configured to force the underestimation can include circuitry configured to set an underestimation coefficient by filtering multiple estimated covariance. Such filtering can be applied over one or more dimensions of (1) time and/or (2) frequency. Moreover, the filtering can be one or a combination of (1) a linear moving average; (2) a weighted moving average, (3) an exponential moving average, (4) a finite-impulse-response (FIR) filter, and (5) an infinite-impulse-response (IIR) filter.

According to an aspect of the described systems and techniques, a method includes: receiving, in a mobile communications device, signals corresponding to separate antennas of the mobile communications device; filtering the signals to reduce noise, interference, or both; estimating noise spatial covariance for the signals corresponding to the separate antennas, including estimating a correlation between the separate antennas; and applying a result of the estimating to the filtering to effect noise whitening and to force an underestimation of the correlation between the separate antennas as applied.

The method can include setting the underestimation based on one or more of SINR, SIR, or SNR estimated at a receiver of the mobile communications device. Setting the underestimation can include setting an underestimation coefficient to zero when a measure of one or more of SNR, SIR, or SINR passes a threshold. The threshold can be a fixed threshold or an adaptive threshold.

The method can include setting the underestimation based on a comparison of covariance terms from the estimating. Setting the underestimation can include setting an underestimation coefficient to zero when a measure of correlation passes a threshold. The method can include setting an underestimation coefficient to a constant less than one. Further, the method can include turning off the noise whitening under certain conditions.

The mobile communications device can have more than two antennas. The method can include setting different underestimation coefficients for the noise whitening. In addition, the method can include setting an underestimation coefficient by filtering multiple estimated covariance. The filtering can be applied over one or more dimensions of (1) time and/or (2) frequency. Moreover, the filtering can be one or a combination of (1) a linear moving average; (2) a weighted moving average, (3) an exponential moving average, (4) a finite-impulse-response (FIR) filter, and (5) an infinite-impulse-response (IIR) filter.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations as described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, the disclosed embodiments below can be implemented in various systems and apparatus, including, but not limited to, a special purpose data processing apparatus (e.g., a wireless access point, a remote environment monitor, a router, a switch, a computer system component, a medium access unit), a mobile data processing apparatus (e.g., a wireless client, a cellular telephone, a personal digital assistant (PDA), a mobile computer, a digital camera), a general purpose data processing apparatus (e.g., a minicomputer, a server, a mainframe, a supercomputer), or combinations of these.

Details of one or more implementations are set forth in the accompanying drawings and the description below. Other features and advantages may be apparent from the description and drawings, and from the claims.

DRAWING DESCRIPTIONS

FIG. 4 shows three examples of soft underestimation.

FIG. 5 shows three examples of hard underestimation.

FIG. 6 shows examples of long term, soft and hard underestimation.

DETAILED DESCRIPTION

Figure 1:
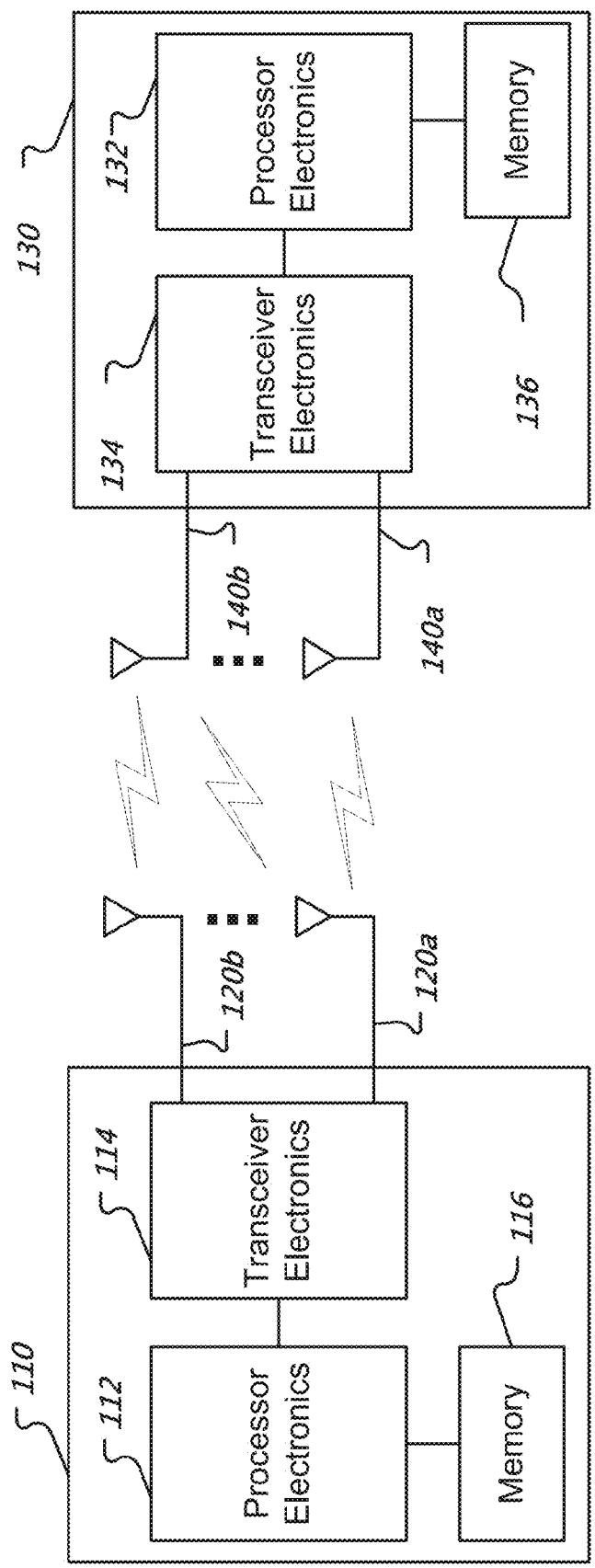
FIG. 1 shows an example of two wireless communication devices transmitting and receiving in a wireless network.

FIG. 1 shows an example of two wireless communication devices transmitting and receiving in a wireless network. Wireless communication devices 110 and 130, such as an access point, base station, access terminal, client station or mobile station, can include processor electronics 112 and 132, such as one or more processors that implement the systems and techniques presented in this disclosure. The wireless communication devices 110, 130 include transceiver electronics 114, 134 to send and/or receive wireless signals over one or more antennas 120*a*, 120*b*, 140*a*, 140*b*. Thus, each device 110, 130 can be considered a transmitter or a receiver, or can include a transmitter and a receiver.

In some implementations, wireless communication devices 110, 130 include multiple radio units. In some implementations, a radio unit includes a baseband unit and a radio frequency unit to transmit and receive signals. Wireless communication devices 110, 130 can also include one or more memories 116, 136 configured to store information such as data and/or instructions. In some implementations, wireless communication devices 110, 130 include dedicated circuitry for transmitting and dedicated circuitry for receiving.

A first wireless communication device 110 can transmit data over multiple wireless channels to a second wireless communication device 130. In some implementations, the first wireless communication device 110 implements a frequency division technique to transmit data to the second wireless communication device 130 using two or more wireless channels operated at different frequency bands. In some implementations, the first wireless communication device 110 implements a space division technique to transmit data to the second wireless communication device 130 using two or more multiplexing matrices to provide spatial separated wireless channels in a single frequency band.

In many wireless and wireline communication systems, the input-output relationship can be expressed as:

$$y = Hx + z,$$

$$z = Gx_{int} + z_{thermal}, \quad (1)$$

where $y \to N_R \times 1$ vector consisting of (multiple) observations of a noisy version of linearly transformed signal x, $N_R \to$ number of parallel channels, and x is the desired signal. As will be appreciated, z is the noise, which can include both interference from communications on other wireless channels ($Gx_{int}$, which can be from the same or a different transmitter) and general random noise from all other sources ($z_{thermal}$). In some cases, the interference signal strength will be greater than the thermal noise, and in some cases, the interference strength will not be greater than the thermal noise.

Noise whitening can be performed to suppress interference and produce significant performance gain. This can be represented mathematically as:

$$\tilde{y} = Wy = H_w x + z_w,$$

$$E[z_w z_w^H] = I$$

$$W = K^{-1/2},$$

$$H_w = WH,$$

$$z_w = Wz, \quad (2)$$

where W is a whitening filter, which is the square root of the inverse of the interference plus noise correlation matrix. Thus, performing such noise whitening typically requires noise spatial covariance matrix estimation (interference estimation):

$$K = E[zz^H]. \quad (3)$$

If this estimation can be performed accurately, a good whitening filter can be generated and applied to the received signal to make the residue noise into white noise, thereby suppressing the interference.

However, in many cases, the receiver has no way to know exactly what the correlation matrix is for the interference plus noise, and thus the receiver must estimate such information through the use of header or other assistance data. Because of this, many traditional receivers do not exploit the correlation structure, and the estimated covariance has a diagonal structure. For example, for a receive observation of size 2 (e.g., two receive antennas) the correlation matrix is just a diagonal matrix as follows:

$$\hat{K}_{conventional} = \begin{bmatrix} \hat{K}_{11} & 0 \\ 0 & \hat{K}_{22} \end{bmatrix}. \quad (4)$$

As shown, the off-diagonal terms are disregarded (set to zero) for simplification.

Figure 2:
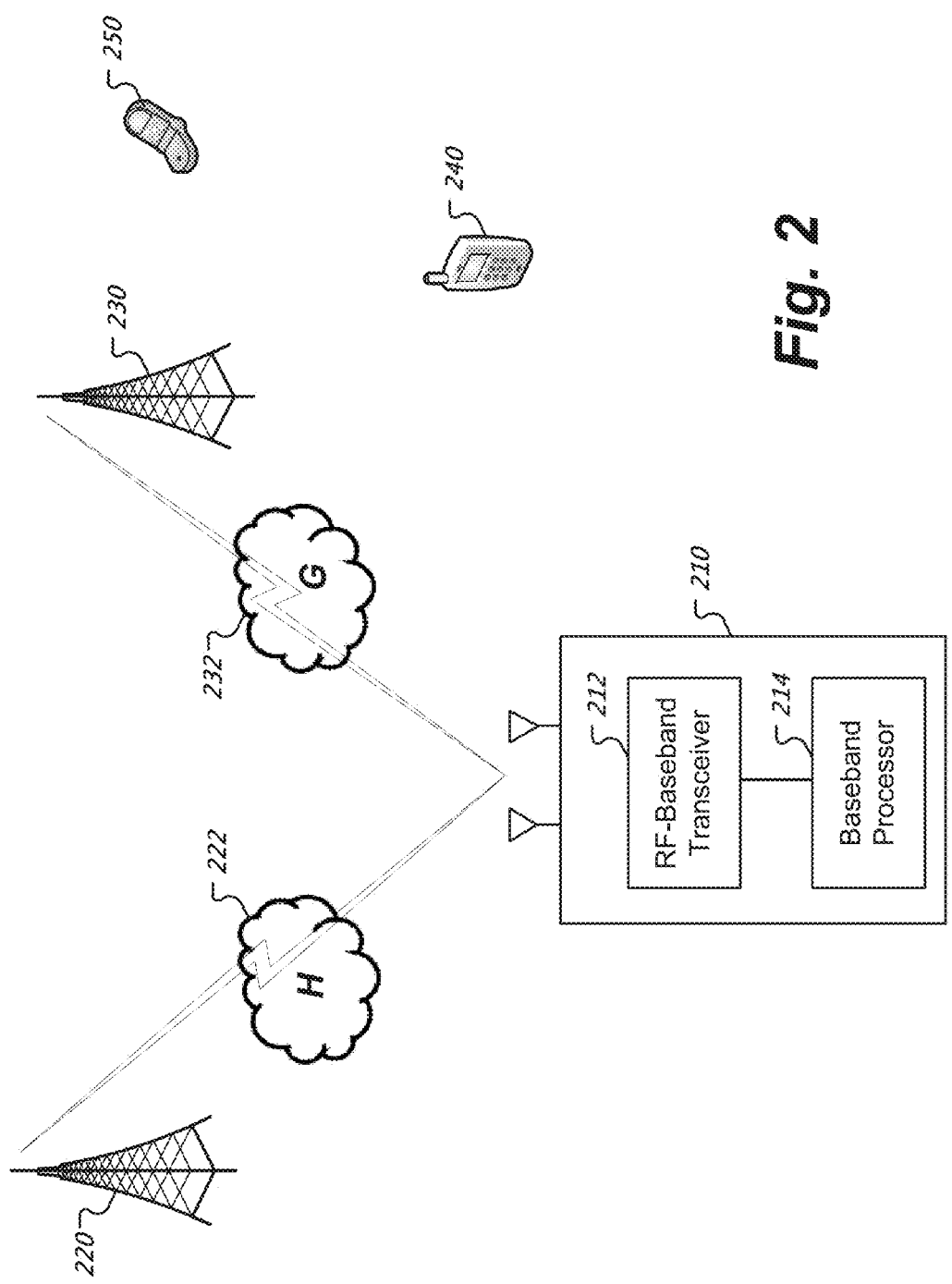
FIG. 2 shows an example of a wireless network with various wireless communication devices, including a wireless communication device with two antennas.

FIG. 2 shows an example of a wireless network with various wireless communication devices, including a wireless communication device with two antennas. Radio frequency (RF) towers 220, 230 send wireless communications to various wireless communication devices 210, 240, 250. The wireless communication device 210 includes two antennas, such as discussed above. Moreover, in addition to white noise and the desired signal received over the channel (H) 222, the signal received at the wireless communication device 210 also includes an interference signal from another wireless communication received over another channel (G) 232.

To improve performance, it would be desirable to estimate and use the off-diagonal terms ($\hat{K}_{12}$ and its conjugate) of the matrix discussed above. Thus, for covariance estimation, when the correlation structure can be reliably estimated, the matrix will be:

$$\hat{K} = \begin{bmatrix} \hat{K}_{11} & \hat{K}_{12} \\ \hat{K}_{12}^* & \hat{K}_{22} \end{bmatrix}. \quad (5)$$

The diagonal terms, $\hat{K}_{11}$ and $\hat{K}_{22}$, indicate the noise power on each receive antenna, whereas $\hat{K}_{12}$ and its conjugate, $\hat{K}_{12}^*$, indicate how correlated the signals received on the two receive antennas are, which is what makes the noise non-white. Knowing this off-diagonal term is the crucial part for whitening the noise and improving performance.

However, since perfect estimation is not possible, the estimated correlation in each instance falls under these two cases: (1) overestimation, $|\hat{K}_{12}|=|\hat{K}_{12}|+\epsilon$, $\epsilon>0$; or (2) underestimation, $|\hat{K}_{12}|=|\hat{K}_{12}|-\epsilon$, $\epsilon>0$. To the extent the estimate is reliable, it can be directly applied, but to the extent that the estimate is not reliable, some mismatch of $\hat{K}_{12}$ and its conjugate $\hat{K}_{12}^*$ will need to be tolerated.

Underestimation often results in a reduction in performance gain over the conventional receiver, but still maintains a performance advantage over the conventional receiver. In contrast, overestimation may suffer performance loss compared to the conventional receiver in which the off-diagonal terms are kept at zero. For example, with a reliable cross-matrix of the spatial correlation, the use of noise whitening can improve the performance of the receiver by 3 dB. But if $\hat{K}_{12}$ is an underestimate, then the gain improvement may only be between 0.5 and 2 dB, depending on the extent of the underestimation; and if the underestimation is extreme, then $\hat{K}_{12}$ goes to zero, which makes the receiver operate as a conventional receiver that ignores the off-diagonal terms.

In contrast, if $\hat{K}_{12}$ is an overestimate, then the correlation between the receive antennas is being over emphasized, which in many cases will cause performance degradation as compared with the conventional receiver. For the same estimation inaccuracy, overestimation hurts more than underestimation. Since it may not be possible to determine where the estimation is falling ($+\epsilon$ or $-\epsilon$), underestimation should be favored over overestimation to provide a more robust receiver.

Thus, the wireless communication device 210 can artificially introduce some underestimation to improve the reliability of the outcome of the use of estimation of the correlation between the signals received on the two antennas, providing some performance gain without a significant chance of performance loss from the baseline of using no correlation estimation. As shown in FIG. 2, the wireless communication device 210 includes RF-baseband transceiver 212 and a baseband processor 214. The transmit section and the receive section of the device 210 can be spread across the RF-baseband transceiver 212 and the baseband processor 214. Moreover, the RF-baseband transceiver 212 and the baseband processor 214 can be implemented as one or more devices, such as one or more integrated circuit (IC) devices in a wireless network chipset configured for use in the device 210. As will be appreciated, regardless of the specifics of a given implementation, the wireless communication device 210 can employ a correlation estimator in which underestimation is more pronounced.

For a two antenna receiver, as shown, correlation underestimation can be represented as:

$$\hat{K}_{under} = \begin{bmatrix} \hat{K}_{11} & \hat{K}_{12} \\ \hat{K}_{12}^* & \hat{K}_{22} \end{bmatrix} \circ \begin{bmatrix} 1 & u \\ u & 1 \end{bmatrix} \quad 0 \leq u \leq 1, \quad (6)$$

where $A \circ B$ is the Hadamard product of two matrices, or the element-wise product, in which u is an underestimation coefficient in a scaling matrix that is multiplied with the estimate of the correlation matrix. As shown in equation (6), the diagonal terms can be left alone, but the off-diagonal terms can be multiplied by the underestimation coefficient, u, which can be defined as a function of the estimates:

$$u = g(\hat{K}_{11}, \hat{K}_{12}, \hat{K}_{22}). \quad (7)$$

Different methods (and their combinations) can be used to choose u. For example, four variants can be employed in various implementations: (1) instantaneous soft underestimation, (2) instantaneous hard underestimation, (3) long term soft underestimation, and (4) long term hard underestimation, where hard underestimation can be viewed as a special case of soft underestimation. As will be appreciated, instantaneous underestimates are applied at the same time the correlation matrix is estimated for a current input signal, and long term underestimates leverage multiple input signals to improve the decision of u.

Figure 3:
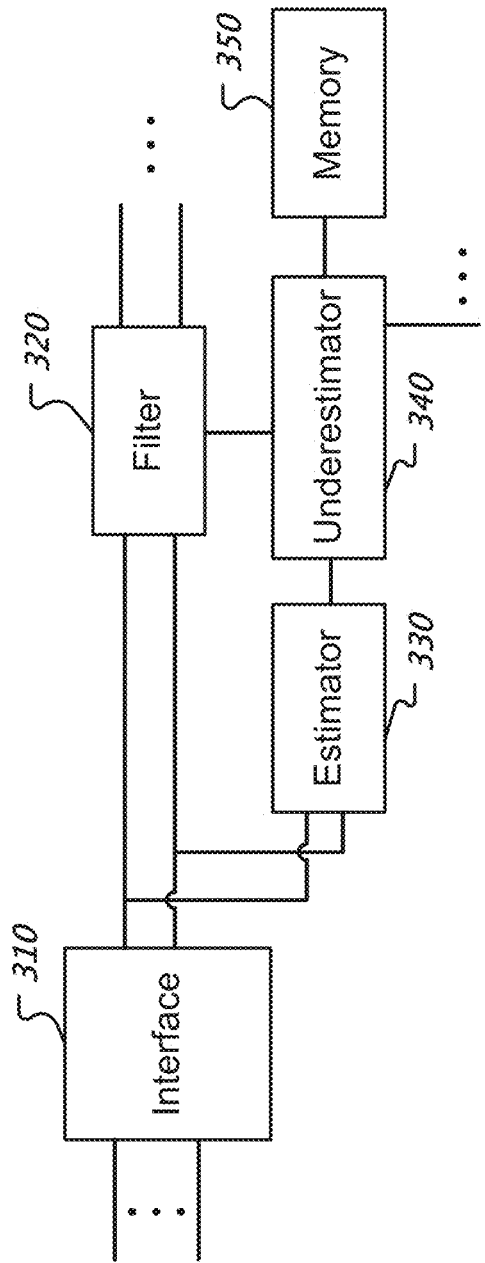
FIG. 3 shows an example of an apparatus that employs artificial correlation underestimation.

FIG. 3 shows an example of an apparatus that employs artificial correlation underestimation. An interface 310 receives signals from two or more separate communication inputs, which can be coupled with two or more antennas of a wireless communications device. For example, the interface can include hardware configured to couple with an IC device in a wireless network chipset for receipt of the input signals. The signals are provided to a filter 320, which reduces, noise, interference or both. For example, the filter 320 can effect noise whitening as described herein. After filtering, the signals can then be provided to further processing elements, either within the apparatus of FIG. 3 or outside of it.

The received signals are also provided to an estimator 330, which determines covariance of the separate communication inputs, including correlation between the separate communication inputs. For example, the correlation matrix of the interference plus noise can be estimated by determining the correlation of the estimated interference and noise, which in turn is estimated by the difference between the desired signals (from the desired signals) and the received signals. In some implementations, the desired signals are constructed after estimating the channels from the desired transmitter. In some implementations, the correlation matrix of the interference plus noise can be estimated by determining the difference between the correlation matrix of the received signals and the correlation matrix of the desired signals. For additional examples of covariance estimation, which can be used with the present systems and techniques, see U.S. patent application Ser. Nos. 13/654,925 and 13/655,766, which are hereby incorporated by reference in their entirety.

In addition, the estimator 330 can estimate noise spatial covariance for signals corresponding to two separate antennas in the wireless communication device 210. An underestimator 340 receives the estimates from the estimator 330 and forces an underestimation of the correlation between the separate communication inputs as applied to the filter 320, thus changing the amount of noise whitening performed to improve the overall performance of the receiver.

In some implementations, the filter 320 can be outside of the apparatus of FIG. 3. In some implementations, the underestimator 340 can receive one or more separate input signals to either influence or replace the use of the covariance estimates in determining the underestimation amount. In some implementations, the apparatus of FIG. 3 can include a memory 350, which can be used to store signal samples, covariance estimates, or both, for long term underestimation techniques.

As will be appreciated, the elements shown in FIG. 3 can be implemented in hardware (e.g., circuitry) or a combination of hardware and code (e.g., a processor and embedded firmware). Moreover, the elements shown in FIG. 3 can be combined in various implementations. For example, the estimator 330, the underestimator 340, and the memory 350 can be integrated with each other. Moreover, the apparatus of FIG. 3 can be designed to implement various types of underestimation and combinations thereof, as described in further detail below.

FIG. 4 shows three examples of soft underestimation. Soft underestimation corresponds to choosing an underestimation coefficient, u, that is a number less than one, which can be defined by a continuous or discontinuous function. For example, the underestimation can be dependent on signal to noise ratio (SNR) information. In some implementations, an SINR (Signal to Interference plus Noise Ratio) estimate can be determined at the receiver, and the underestimation coefficient can be set equal to a decreasing function of SINR 410. As the SINR becomes larger, the benefit of applying the noise whitening filter becomes smaller. If the interference plus noise is negligible, as compared with the signal, then the receiver can tend to just using the diagonal matrix to fade out the unreliability of the cross-correlation, and as the signal and the interference plus noise become closer, then the benefit of applying the filter increases, and more of the cross-correlation estimates should be used.

Another example of soft underestimation is piecewise correlation dependent underestimation. The diagonal term can be compared with the off-diagonal term in the correlation matrix, which indicates how correlated the MIMO channel is. For example, the absolute value of the $\hat{K}_{12}$ term can be squared and compared with the $\hat{K}_{11}$ and $\hat{K}_{22}$ terms to assess the covariance, such as shown at 420 in FIG. 4. If the covariance of the interference-plus-noise is small, then a larger underestimation coefficient, u, can be selected, and if the covariance of the MIMO channel is large, then a smaller underestimation coefficient, u, can be selected.

As another example, fixed underestimation can be employed in one or more implementations. For example, the underestimation coefficient, u, can be set to a constant for all covariance ensembles, such as shown at 430 in FIG. 4. Examples of constants that can work well in some implementations include u=0.6 and u=0.8.

FIG. 5 shows three examples of hard underestimation. Hard underestimation corresponds to choosing an underestimation coefficient, u, that is either zero or one. In some implementations, when a measure of correlation falls below a threshold, indicating low correlation and thus low interference, then the advanced noise whitening can be turned off in the receiver. For example, as shown at 510 in FIG. 5, if $|\hat{K}_{12}|^2$ is less than or equal to T $\hat{K}_{11}\hat{K}_{22}$, then u can be set to zero; otherwise, u can be set to one (or a soft u value in the case of a combination of hard and soft underestimation). Examples of a threshold T that can work well in some implementations include T=0.1 and T=0.3.

In some implementations, when observed SNR is high, then the advanced noise whitening can be turned off in the receiver. For example, as shown at 520 in FIG. 5, given the received signals or the desired signals are scaled within a fixed range, when the maximum of $\hat{K}_{11}$ and $\hat{K}_{22}$ falls below a threshold, then u can be set to zero; otherwise, u can be set to one (or a soft u value in the case of a combination of hard and soft underestimation). For example, if the received signals are scaled to 1, examples of the threshold for $\hat{K}_{11}$ and $\hat{K}_{22}$ that can work well in some implementations are T=−10 dB and T=−15 dB. In another example, the SNR threshold can be adaptive based on the requirement of transmission (for example, T=−10 dB for low coding rate transmission, and T=−15 dB for high coding rate transmission).

In some implementations, the determinant (det) of the spatial correlation matrix can be used as an indicator of the correlation, and the advanced noise whitening can be turned off in the receiver when the determinant is high. For example, as shown at 530 in FIG. 5, when det($\hat{K}$) is greater than or equal to T $\hat{K}_{11}\hat{K}_{22}$, then u can be set to zero; otherwise, u can be set to one (or a soft u value in the case of a combination of hard and soft underestimation). Examples of a threshold T that can work well in some implementations include T=0.7 and T=0.9. Note that the determinant is a defined property of a matrix; if the determinant is zero, this means the matrix is ill conditioned, and if the determinant is large then it is more likely to be uncorrelated.

FIG. 6 shows examples of long term, soft and hard underestimation. Typically, interference conditions remain fairly constant in a time/frequency window. Thus, estimates of interference over a time/frequency window can be taken into consideration when determining the underestimation to perform. Such longer term processing can improve the decision. For example, multiple instances of covariance can be made available and considered. In such cases, the advanced receiver filtering function can be turned off when low interference or almost white interference conditions are detected. For example, long term hard underestimation can be implemented as shown at 610 in FIG. 6. In this example, T can be set to 0.1. As another example, long term soft underestimation can be implemented as shown at 620 in FIG. 6.

The examples here correspond to a moving average, but in general, any filtering over time and/or frequency can be used. It need not be a linear average. In some implementations, a weighted moving average can be used to weight the more current observations more than the less current ones. In some implementations, a one-tap IIR filter (or exponential moving average) can be used to adaptively weight the observations based on the time elapsed. In some implementations, higher order of IIR or FIR filters can be also used with coefficients carefully chosen.

As will be appreciated, various combinations of the underestimation methods described above in connection with FIGS. 4-6 can be made. In many cases, both soft and hard underestimation techniques can be combined to achieve good performance. In general, soft underestimation provides an underestimation coefficient u (e.g., a fixed u) that is less than one. This reduces the effect of interference cancellation in all cases to minimize performance loss due to overestimation of the correlation. Hard underestimation switches back to a conventional receiver approach under certain conditions (e.g., detection of low interference correlation).

Figure 7:
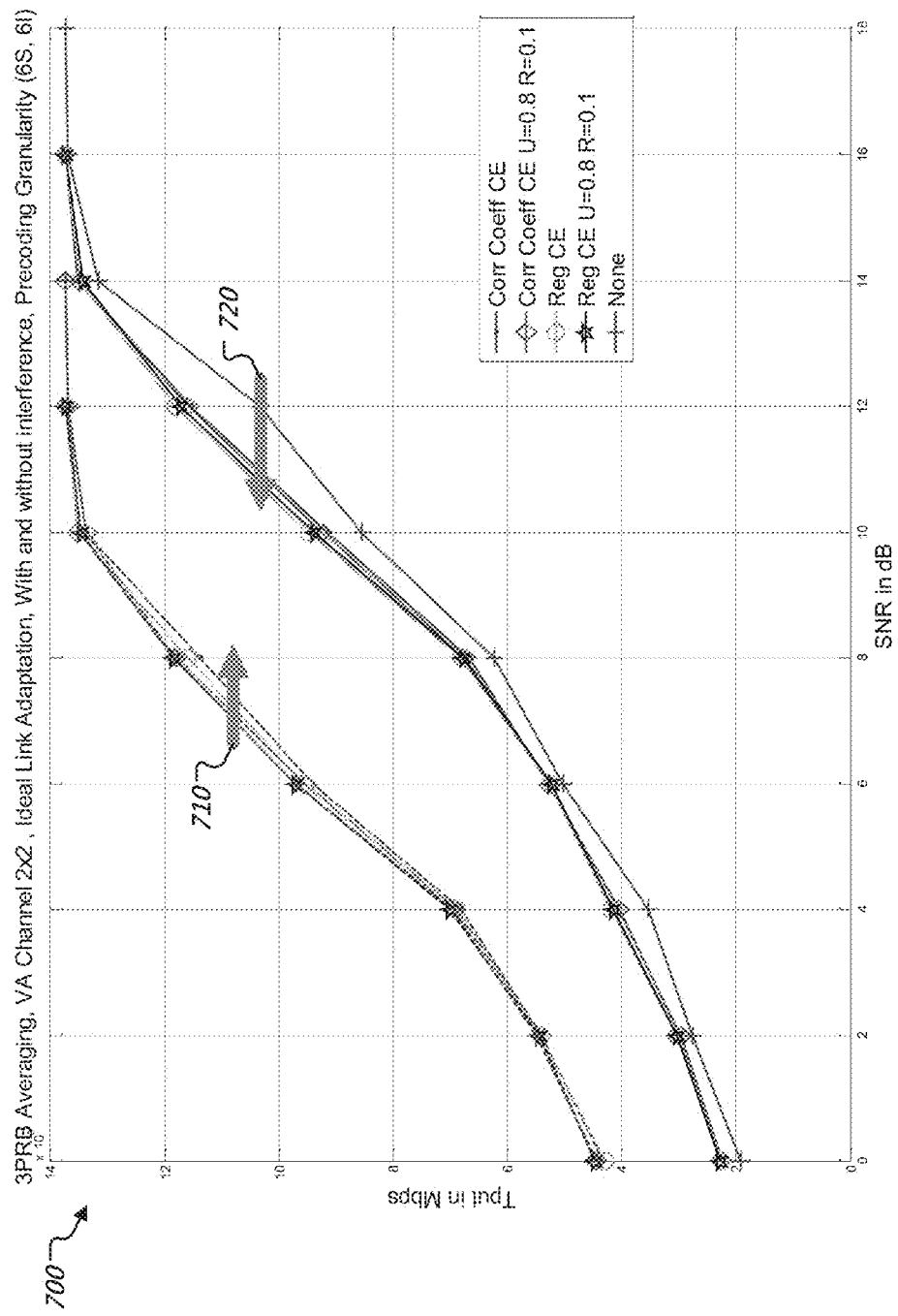
FIG. 7 is a graph showing performance gain and robustness in accordance with the systems and techniques described herein.

FIG. 7 is a graph 700 showing performance gain and robustness in accordance with the systems and techniques described herein. The system under study is a LTE downlink receiver equipped with 2 receive antennas. The serving e-Node-B (eNB) and the interfering eNB (if present) are both equipped with 2 transmit antennas. Two kinds of interference-plus-noise correlation matrix estimation are evaluated: (1) regular channel estimation based, or "Reg CE", (2) correlation coefficient assisted channel estimation based, or "Corr Coeff CE". A combination of soft and hard underestimation is adopted with (1) fixed underestimation of U=0.8 in 430 and (2) a hard decision with threshold R=0.1 in 510. The performance with no interference estimation and suppression is also shown as baseline, marked as "none".

Loss from the receiver is shown at 710 in FIG. 7 when there is no interference. It is shown that interference filtering with underestimation is almost identical to the baseline performance (without interference filtering), which is optimal in this case. The interference filtering is under around 0.5 dB loss without underestimation. In certain cases, the performance due to lack of underestimation can be much larger, which is not shown here.

Gain from the receiver is shown at 720 with interference. The interference filtering with underestimation is almost identical that of no underestimation, which is optimal in this case, and shows a 1.5 dB gain over no interference filtering. Larger gain can be expected in different scenarios, which are not shown here. As shown, underestimation improves robustness for weak interference while having little or none performance loss with interference present.

The detailed description above focuses on the two antenna case, however, the systems and techniques described can be implemented in wireless communication systems with more antennas. For a three antenna receiver, underestimation can be done with two parameters. First and second order underestimation coefficients can be provides as follows:

$$\hat{K}_{under} = \begin{bmatrix} \hat{K}_{11} & \hat{K}_{12} & \hat{K}_{13} \\ \hat{K}_{12}^* & \hat{K}_{22} & \hat{K}_{23} \\ \hat{K}_{13}^* & \hat{K}_{23}^* & \hat{K}_{33} \end{bmatrix} \circ \begin{bmatrix} 1 & u_1 & u_2 \\ u_1 & 1 & u_1 \\ u_2 & u_1 & 1 \end{bmatrix} \quad 0 \le u_i \le 1. \quad (8)$$

In general, for an N antenna receiver, underestimation can be modeled as:

$$\hat{K}_{under}(i,j) = u_{|i-j|}\hat{K}(i,j), \quad (9)$$

where $u_0 = 1, u_1, u_2, \ldots, u_{N-1}$ are underestimation coefficients.

In the most general case, each unique element in the covariance can have an underestimation coefficient:

$$\hat{K}_{under}(i,j) = u_{ij}\hat{K}(i,j)$$

$$u_{ii} = 1,$$

$$u_{ij} = u_{ji}, \quad (10)$$

For choosing the coefficients, similar principals can be used as in the case of N=2. That is, the soft, hard, or a combination of soft and hard underestimation can be adopted. In addition, the different underestimation coefficients can be selected jointly or independently. Example of independent coefficient selection, in some implementation, is to determine a unique $u_{ij}$ for each i, and j. The determination of $u_{ij}$ can be based on different underestimation rules (soft, hard, or combined) for each pair of i and j. Example of joint coefficient selection, in some implementations, is to determine one underestimation scaling value for all i and j pairs, except i=j. In some other implementation, the underestimation coefficient $u_{ij}$ can be assigned the same value in groups. The distance to the diagonal is one example of such a grouping policy, as shown in (9). Other grouping policy can be based on antenna configurations and/or deployment scenarios.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments. Further, although described in the context of wireless communications, various aspects of this disclosure may be implemented in wireline communication systems.

Other embodiments fall within the scope of the following claims.

What is claimed is:

1. An apparatus comprising:
    circuitry configured to receive signals from separate communication inputs;
    circuitry configured to filter the signals to reduce noise, interference, or both;
    circuitry configured to estimate covariance of the separate communication inputs, including estimating a correlation between the separate communication inputs; and
    circuitry configured to apply the covariance estimation to the filtering circuitry to effect noise whitening and to force an underestimation of the correlation between the separate communication inputs as applied.

2. The apparatus of claim 1, wherein the circuitry configured to force the underestimation comprises circuitry configured to set the underestimation in accordance with a decreasing function of SINR (Signal to Interference plus Noise Ratio).

3. The apparatus of claim 1, wherein the circuitry configured to force the underestimation comprises circuitry configured to turn off the noise whitening when SNR (Signal to Noise Ratio) exceeds a threshold.

4. The apparatus of claim 1, wherein the circuitry configured to force the underestimation comprises circuitry configured to set a piecewise correlation dependent underestimation.

5. The apparatus of claim 1, wherein the circuitry configured to force the underestimation comprises circuitry configured to turn off the noise whitening when correlation falls below a threshold.

6. The apparatus of claim 1, wherein the circuitry configured to force the underestimation comprises circuitry configured to set an underestimation coefficient to a constant greater than zero and less than one.

7. The apparatus of claim 1, wherein the circuitry configured to force the underestimation comprises circuitry configured to set an underestimation coefficient to zero when a determinant (det) of a spatial correlation matrix passes a threshold.

8. The apparatus of claim 1, wherein the separate communication inputs comprise antennas in a multiple-in-multiple-out communications system.

9. The apparatus of claim 8, comprising more than two antennas.

10. The apparatus of claim 8, comprising a baseband processor comprising the circuitries.

11. A method comprising:
    receiving, in a mobile communications device, signals corresponding to separate antennas of the mobile communications device;
    filtering the signals to reduce noise, interference, or both;
    estimating noise spatial covariance for the signals corresponding to the separate antennas, including estimating a correlation between the separate antennas; and
    applying a result of the estimating to the filtering to effect noise whitening and to force an underestimation of the correlation between the separate antennas as applied.

12. The method of claim 11, comprising setting the underestimation based on SINR (Signal to Interference plus Noise Ratio) estimated at a receiver of the mobile communications device.

13. The method of claim 12, wherein setting the underestimation comprises setting an underestimation coefficient to zero when a measure of SNR passes a threshold.

14. The method of claim 11, comprising setting the underestimation based on a comparison of covariance terms from the estimating.

15. The method of claim 14, wherein setting the underestimation comprises setting an underestimation coefficient to zero when a measure of correlation passes a threshold.

16. The method of claim 11, comprising setting an underestimation coefficient to a constant less than one.

17. The method of claim 16, comprising turning off the noise whitening under certain conditions.

18. The method of claim 11, wherein the mobile communications device has more than two antennas.

19. The method of claim 18, comprising setting different underestimation coefficients for the noise whitening.

* * * * *